US010801417B1

(12) United States Patent
Claywell et al.

(10) Patent No.: US 10,801,417 B1
(45) Date of Patent: Oct. 13, 2020

(54) METHODS AND SYSTEMS FOR REGULATING EXHAUST GAS FLOW

(71) Applicant: GM GLOBAL TECHNOLOGY OPERATIONS LLC, Detroit, MI (US)

(72) Inventors: Mark R. Claywell, Birmingham, MI (US); Maqsood Rizwan Ali Khan, Troy, MI (US); Ryan Calkin, Oak Park, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 16/510,316

(22) Filed: Jul. 12, 2019

(51) Int. Cl.
*F02D 9/06* (2006.01)
*F02D 41/14* (2006.01)
*F02D 41/00* (2006.01)

(52) U.S. Cl.
CPC ............ *F02D 9/06* (2013.01); *F02D 41/1446* (2013.01); *F02D 41/1448* (2013.01); *F02D 2041/0017* (2013.01)

(58) Field of Classification Search
CPC .... F02D 9/06; F02D 41/1446; F02D 41/1448; F02D 2041/0017; Y02T 10/144; F05D 2220/40; B60Y 2400/435; F01D 25/24; F02M 35/10301
See application file for complete search history.

(56) References Cited

U.S. PATENT DOCUMENTS

| | | | | |
|---|---|---|---|---|
| 6,152,853 A * | 11/2000 | Banks, III | ............ | B60W 30/18 477/119 |
| 6,609,495 B1 * | 8/2003 | Cornell | ................... | F02D 13/04 123/321 |
| 7,004,142 B2 * | 2/2006 | Ball | ........................ | F02D 9/06 123/323 |
| 9,810,122 B2 * | 11/2017 | Martin | ................... | F02B 37/105 |
| 9,862,262 B2 * | 1/2018 | Martin | ................. | F02B 63/042 |
| 10,006,353 B2 * | 6/2018 | Koike | ................ | F02D 41/2429 |
| 10,605,159 B2 * | 3/2020 | Kurtz | ....................... | F01L 13/06 |
| 2019/0285005 A1 * | 9/2019 | Nakamura | ............. | F02D 41/04 |

* cited by examiner

*Primary Examiner* — Jesse S Bogue
(74) *Attorney, Agent, or Firm* — Quinn IP Law

(57) ABSTRACT

A method and system for regulating an exhaust gas flow includes providing an engine and an exhaust system coupled to the engine, the exhaust system including a variable-geometry turbocharger and exhaust tubing including an exhaust pipe bellows and providing a controller and at least one sensor in communication with the controller, the at least one sensor configured to measure an engine speed of the engine. The method includes determining whether a first condition is satisfied and in response to satisfaction of the first condition, determining an exhaust gas temperature at the exhaust pipe bellows and determining a time delay for regulation of the exhaust gas flow to the variable-geometry turbocharger. The method includes controlling the exhaust gas flow to the variable-geometry turbocharger based on the determined time delay.

20 Claims, 2 Drawing Sheets

METHODS AND SYSTEMS FOR REGULATING EXHAUST GAS FLOW

INTRODUCTION

The present disclosure relates generally to methods and systems for exhaust braking control and regulation of exhaust gas flow to reduce bellows fatigue and cracking.

During exhaust braking conditions, the engine is motored and the exhaust gases are relatively cool when the throttle is lifted. However, before the throttle is lifted, the exhaust gas temperature is high, which can cause stress on the bellow joints of the exhaust gas system. The rapid change in temperature can cause thermal stress on the bellow joints. Additionally, the exhaust pressure is often higher under motored engine braking conditions than under fired conditions, also creating stress on the bellow joints.

SUMMARY

Embodiments according to the present disclosure provide a number of advantages. For example, embodiments according to the present disclosure enable reduction of bellows stress through reduced thermal stress and reduced pressure as the rapid exhaust gas temperature change occurs, reducing bellows fatigue and cracking.

In an exemplary embodiment of the present disclosure, a method for exhaust braking control includes providing the vehicle with a propulsion system and an exhaust system coupled to the propulsion system, the exhaust system including a variable-geometry turbocharger and an exhaust pipe bellows coupled to the variable-geometry turbocharger and providing the vehicle with a controller, a first sensor in communication with the controller, and a second sensor in communication with the controller, the first sensor configured to measure an engine speed of the vehicle and the second sensor configured to measure an exhaust gas temperature. The method includes receiving, by the controller, first sensor data from the first sensor and second sensor data from the second sensor and determining, by the controller, from one or both of the first and second sensor data, whether a first condition is satisfied. In response to satisfaction of the first condition, the method includes determining, by the controller, an exhaust gas temperature at the exhaust pipe bellows and determining, by the controller, a time delay for regulation of an exhaust gas flow to the variable-geometry turbocharger. The method includes controlling, by the controller, the exhaust gas flow to the variable-geometry turbocharger based on the determined time delay.

In exemplary embodiments, the first condition is satisfied when the measured engine speed is above an exhaust engine braking speed.

In exemplary embodiments, controlling the exhaust gas flow to the variable-geometry turbocharger includes delaying a maximum restriction of the exhaust gas flow to the variable-geometry turbocharger for the determined time delay.

In exemplary embodiments, determining the time delay for regulation of the exhaust gas flow to the variable-geometry turbocharger is based on a predetermined temperature limit of the exhaust pipe bellows as compared to the exhaust gas temperature at the exhaust pipe bellows.

In exemplary embodiments, the predetermined temperature limit is determined from a look-up table including material property data of the exhaust pipe bellows.

In exemplary embodiments, determining the time delay for regulation of the exhaust gas flow to the variable-geometry turbocharger is based on the exhaust engine braking speed.

In exemplary embodiments, determining the time delay for regulation of the exhaust gas flow to the variable-geometry turbocharger is based on a road load determined during positive torque production of the propulsion system.

In exemplary embodiments, determining the time delay for regulation of the exhaust gas flow to the variable-geometry turbocharger is based on both the exhaust engine braking speed and a road load determine during positive torque production of the propulsion system.

In an exemplary embodiment of the present disclosure, a method for regulating an exhaust gas flow includes providing an engine and an exhaust system coupled to the engine, the exhaust system including a variable-geometry turbocharger and exhaust tubing including an exhaust pipe bellows and providing a controller and at least one sensor in communication with the controller, the at least one sensor configured to measure an engine speed of the engine and output a measured engine speed. The method includes determining, by the controller, whether a first condition is satisfied and in response to satisfaction of the first condition, determining, by the controller, an exhaust gas temperature at the exhaust pipe bellows and determining, by the controller, a time delay for regulation of the exhaust gas flow to the variable-geometry turbocharger. The method includes controlling, by the controller, the exhaust gas flow to the variable-geometry turbocharger based on the determined time delay.

In exemplary embodiments, the first condition is satisfied when the measured engine speed is above an exhaust engine braking speed.

In exemplary embodiments, controlling the exhaust gas flow to the variable-geometry turbocharger includes delaying a maximum restriction of the exhaust gas flow to the variable-geometry turbocharger for the determined time delay.

In exemplary embodiments, determining the time delay for regulation of the exhaust gas flow to the variable-geometry turbocharger is based on a predetermined temperature limit of the exhaust pipe bellows.

In exemplary embodiments, the predetermined temperature limit is determined from a look-up table including material property data of the exhaust pipe bellows.

In exemplary embodiments, determining the time delay for regulation of the exhaust gas flow to the variable-geometry turbocharger is based on the exhaust engine braking speed.

In exemplary embodiments, determining the time delay for regulation of the exhaust gas flow to the variable-geometry turbocharger is based on a road load determine during positive torque production of the propulsion system.

In exemplary embodiments, determining the time delay for regulation of the exhaust gas flow to the variable-geometry turbocharger is based on both the exhaust engine braking speed and a road load determine during positive torque production of the propulsion system.

In exemplary embodiments, the at least one sensor includes a first sensor configured to measure an engine speed of the engine and a second sensor configured to measure an exhaust gas temperature and determining the time delay for regulation of the exhaust gas flow to the engine is based on both a predetermined temperature limit of the exhaust pipe bellows as compared to the exhaust gas temperature and the exhaust engine braking speed.

In an exemplary embodiment of the present disclosure an automotive vehicle system includes a propulsion system and an exhaust system coupled to the propulsion system, the exhaust system including a variable-geometry turbocharger and exhaust tubing coupled to the variable-geometry turbocharger, the exhaust tubing including an exhaust pipe bellows. The automotive vehicle also includes a first sensor configured to measure an engine speed of the vehicle and output first sensor data including a measured engine speed. The automotive vehicle also includes a second sensor configured to measure an exhaust gas temperature and output second sensor data including a measured exhaust gas temperature. The automotive vehicle also includes at least one controller in communication with the first and second sensors and configured to receive the first sensor data from the first sensor and the second sensor data from the second sensor. The at least one controller is configured to, in response to satisfaction of a first operating condition, determine a time delay for regulation of an exhaust gas flow to the variable-geometry turbocharger and control the exhaust gas flow to the variable-geometry turbocharger based on the determined time delay.

In exemplary embodiments, the first operating condition is satisfied when the measured engine speed is above an exhaust engine braking speed.

In exemplary embodiments, the time delay for regulation of exhaust gas flow to the variable-geometry turbocharger is based on one or more of the exhaust engine braking speed and a road load determined during positive torque production of the propulsion system.

BRIEF DESCRIPTION OF THE DRAWINGS

The present disclosure will be described in conjunction with the following figures, wherein like numerals denote like elements.

Figure 1:
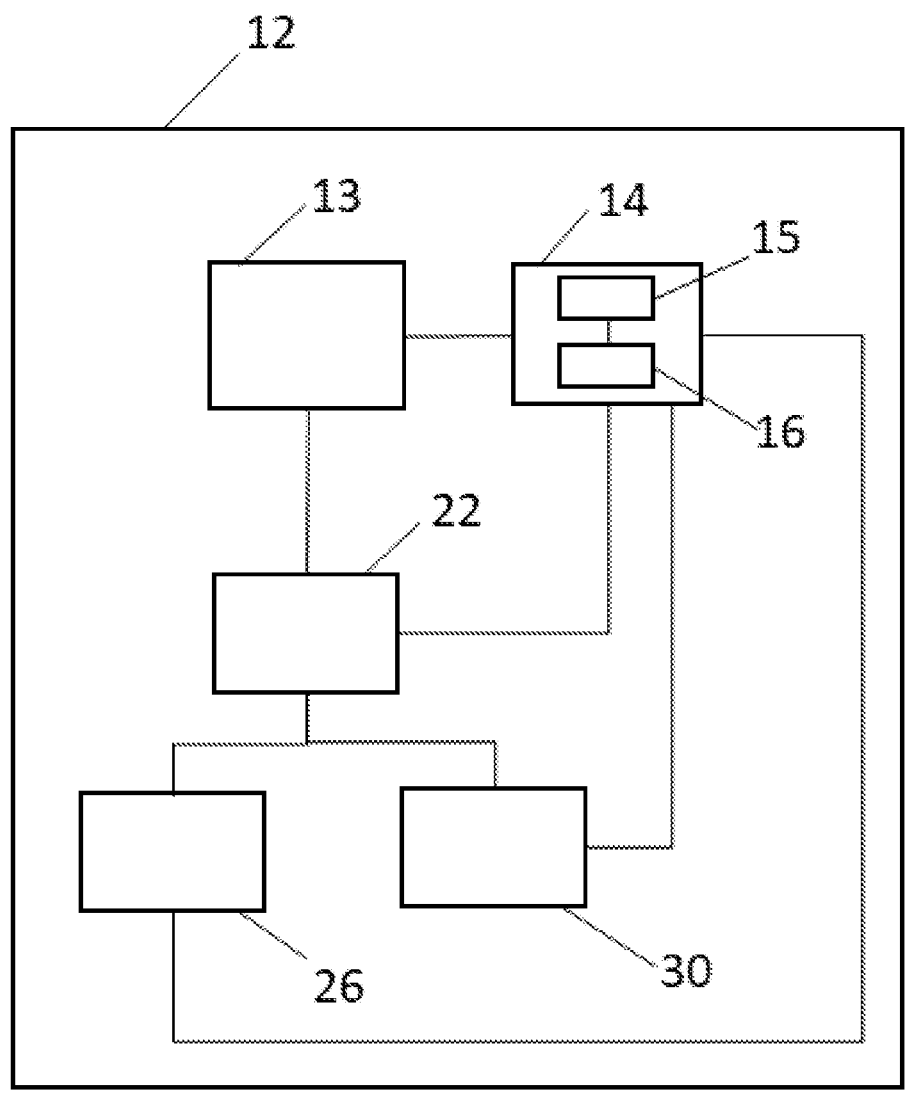
FIG. 1 is a schematic block diagram of a vehicle, according to an embodiment of the present disclosure.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above derivatives thereof, and words of similar import.

A bellows is a component installed in a vehicle exhaust system to allow thermal growth of the exhaust, allow for misalignment of the exhaust pipes attached to the engine, and accommodate vibration of the exhaust pipes. The bellows generally consists of a thin-walled shell of revolution with a corrugated meridian to provide the flexibility needed to absorb mechanical movement. Consideration of fatigue is generally an important aspect of the design of metallic bellows expansion joints. These components are subject to high thermal loads as well as displacement loading which can result in cyclic strains.

FIG. 1 is a block diagram of a vehicle 12 that includes a propulsion system 13 coupled to an exhaust system 14. The propulsion system 13 is configured to power the vehicle 12 via a transmission (not shown). In various embodiments, the propulsion system 13 includes an internal combustion engine, an electric machine such as a traction motor, and/or a fuel cell propulsion system. In various embodiments, the vehicle 12 may be a passenger car or any other vehicle including motorcycles, trucks, sport utility vehicles (SUVs), recreational vehicles (RVs), marine vessels, aircraft, etc.

In some embodiments, the exhaust system 14 includes an exhaust gas recirculation system including a variable-geometry turbocharger (VGT) 15 and various tubing including exhaust pipe bellows 16. Exhaust gases flow from the propulsion system 13 via the exhaust tubing including exhaust pipe bellows 16 to the turbocharger 15. In some embodiments, the variable-geometry turbocharger 15 includes a turbine and at least one valve, vane, or nozzle regulating the flow of exhaust gases to the turbine. The flow of exhaust gas to the turbine may be regulated directly by the controller 22 via an actuator coupled to the turbocharger, as discussed herein. In various embodiments, high exhaust gas temperatures at the bellows 16 located upstream of the turbocharger 15 result in bellows stress and fatigue that may shorten the life of the bellows 16.

The propulsion system 13 and the exhaust system 14 are in communication with or under the control of at least one controller 22. While depicted as a single unit for illustrative purposes, the controller 22 may additionally include one or more other controllers, collectively referred to as a "controller." The controller 22 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 22 in controlling the vehicle.

In various embodiments, the controller 22 receives input from a plurality of sensors 26, which may include engine speed sensors, exhaust gas temperature sensors, optical cameras, thermal cameras, ultrasonic sensors, and/or additional sensors as appropriate. The controller 22 is configured to control the propulsion system 13 and the exhaust system 14 via a plurality of actuators 30 in response to the inputs from the plurality of sensors 26. In various embodiments, a sensor 26 downstream of the turbocharger 15 and provides an exhaust gas temperature at that location in the exhaust system. Additionally, in various embodiments, a sensor 26 located upstream of the turbocharger 15 provides data regarding an upstream exhaust gas temperature at a location that is different from the location of the pipe bellows 16.

Figure 2:
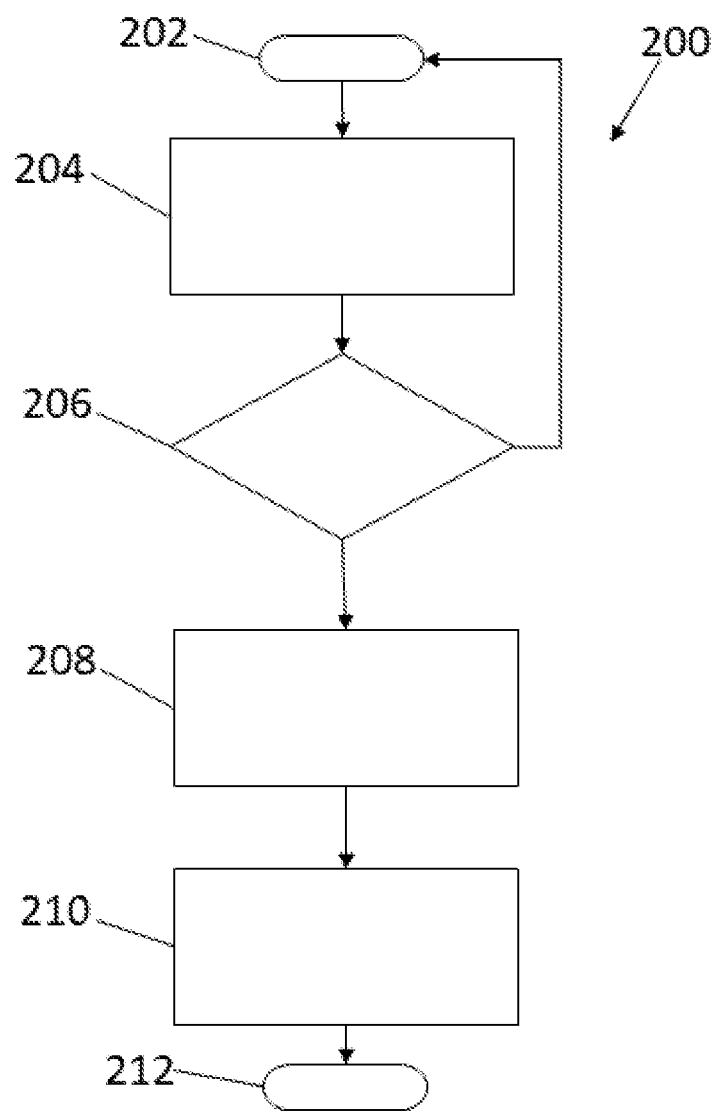
FIG. 2 is a flowchart representation of a method for exhaust braking control, according to an embodiment of the present disclosure.

FIG. 2 illustrates a method 200 for exhaust braking control, according to an embodiment of the present disclosure. The method 200 can be utilized in connection with the controller 22 as discussed herein, or by other systems associated with or separate from the vehicle, in accordance with exemplary embodiments. The order of operation of the method 200 is not limited to the sequential execution as illustrated in FIG. 2, but may be performed in one or more varying orders, or steps may be performed simultaneously, as applicable in accordance with the present disclosure.

Beginning at 202, the method 200 proceeds to 204. At 204, the controller 22 receives and monitors inputs from the plurality of sensors 26. The inputs include sensor data regarding engine speed and exhaust gas temperature, for example and without limitation. In various embodiments, one of the sensors 26 measures an exhaust gas temperature downstream of the turbocharger 15. In various embodiments, another of the sensors 26 measures an exhaust gas temperature upstream of the turbocharger 15 but at a location different from the pipe bellows 16.

Next, at 206, the controller 22 determines whether a first condition is satisfied. In various embodiments, the first condition is satisfied when the engine speed, as determined from sensor data received from one of the sensors 26, is above an exhaust braking engine speed. If the determination at 206 is negative, that is, the engine speed is not above the exhaust braking engine speed, the method 200 restarts from the start block 202 and the controller 22 continues to monitor the exhaust gas temperature and/or the engine speed.

In various embodiments, the first condition is satisfied when the regulation of exhaust gas flow through the variable-geometry turbocharger is greater than 50% and the exhaust gas temperature, as measured by one of the sensors 26, is higher than a predetermined temperature value.

If the determination at 206 is positive, that is, the engine speed is above the exhaust braking engine speed and/or the regulation of exhaust gas flow is greater than 50% and/or the exhaust gas temperature is higher than the predetermined temperature value, the method 200 proceeds to 208. In various embodiments, prior to increasing the exhaust pressure by closing the flow of gas to the turbocharger 15, a temperature of the exhaust gas at or in the vicinity of the pipe bellows 16 is determined either via direct measurement or inference from a modeled exhaust temperature. At 208, the exhaust gas temperature at or in the vicinity of the pipe bellows 16 is determined by the controller 22. To determine the exhaust gas temperature at or in the vicinity of the pipe bellows 16, the controller 22 analyzes data from the plurality of sensors 26, and/or uses a physics-based temperature model based on the measured exhaust gas temperature downstream and/or upstream of the turbocharger 15 and the pipe bellows 16.

Next, at 210, the controller 22 determines a time delay for regulation of exhaust gas flow to the turbocharger 15. Maximum restriction of the flow of exhaust gas to the turbocharger 15 is delayed based on an acceptable maximum temperature limit for the pipe bellows 16 that reduces stress and bellows fatigue. In various embodiments, the temperature limit is determined from a calibration or look-up table. The calibration table includes temperatures limits based on material property data of the exhaust gas pipe bellows 16. The temperature limit is matched with a corresponding time delay to allow the flow of cooler exhaust gases through the pipe bellows 16 prior to maximum restriction of the flow of exhaust gases to the turbocharger 15. In various embodiments, the calibration table is a look-up table stored within or accessible to the controller 22.

In various embodiments, the controller 22 monitors the exhaust gas temperature for a temperature decrease by a predetermined value (such as, for example, a predetermined number of degrees Celsius). The controller 22 delays further restriction of exhaust gas flow to the variable-geometry turbocharger 15 until the exhaust gas temperature, as measured by one of the sensors 26, drops by the predetermined value.

In various embodiments, the controller 22 determines the time delay for regulation of the exhaust gas flow to the turbocharger 15 from the engine speed data, specifically exhaust engine braking speed. In various embodiments, the controller 22 determines the time delay for regulation of the exhaust gas flow to the turbocharger 15 based on data regarding one or more conditions, including the measured or estimated temperature of the exhaust gases at or in the vicinity of the pipe bellows 16, the engine braking speed, and a road load of the vehicle determined during positive torque production of the engine.

The controller 22 generates a control signal that is transmitted to the actuator 30 or directly to the at least one valve, vane, or nozzle or to the turbocharger 15 directly to delay restriction of the flow of exhaust gases to the turbocharger, and thus delay the pressure increase in the pipe bellows 16, until after the determined time delay has elapsed. The algorithm then terminates.

Delaying the regulation of the flow of exhaust gases to the turbocharger allows the cooler gases generated during the engine motoring condition to cool the exhaust pipe bellows 16 before maximum restriction of the exhaust gas flow to the turbocharger 15 results in maximum exhaust gas pressure within the pipe bellows 16. In various embodiments, the time delay is a function of exhaust engine braking speed and/or road load determined prior to an engine braking operation. That is, the time delay is determined from a road load determined during positive torque production of the engine (a fired engine condition). In various embodiments, an average road load is determined from a plurality of road load measurements obtained prior to the engine motoring condition. Lowering the temperature of the pipe bellows 16 when peak stress occurs improves the fatigue life of the pipe bellows 16.

The predetermined values and limits discussed herein are based, in various embodiments, on the configuration of the propulsion system, the vehicle configuration (if applicable), and various other physical, environmental, and operating considerations.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components. Such example devices may be on-board as part of a vehicle computing system or be located off-board and conduct remote communication with devices on one or more vehicles.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method for exhaust braking control in a vehicle, comprising:
providing the vehicle with a propulsion system and an exhaust system coupled to the propulsion system, the exhaust system including a variable-geometry turbocharger and an exhaust pipe bellows coupled to the variable-geometry turbocharger;
providing the vehicle with a controller, a first sensor in communication with the controller, and a second sensor in communication with the controller, the first sensor configured to measure an engine speed of the vehicle and the second sensor coupled to the exhaust system and configured to measure an exhaust gas temperature;
receiving, by the controller, first sensor data from the first sensor and second sensor data from the second sensor;

determining, by the controller, from one or both of the first and second sensor data, whether a first condition is satisfied;

in response to satisfaction of the first condition, determining, by the controller, an exhaust gas temperature at the exhaust pipe bellows and determining, by the controller, a time delay for regulation of an exhaust gas flow to the variable-geometry turbocharger; and controlling, by the controller, the exhaust gas flow to the variable-geometry turbocharger based on the determined time delay.

2. The method of claim 1, wherein the first condition is satisfied when the measured engine speed is above an exhaust engine braking speed.

3. The method of claim 2, wherein determining the time delay for regulation of the exhaust gas flow to the variable-geometry turbocharger is based on the exhaust engine braking speed.

4. The method of claim 2, wherein determining the time delay for regulation of the exhaust gas flow to the variable-geometry turbocharger is based on both the exhaust engine braking speed and a road load determine during positive torque production of the propulsion system.

5. The method of claim 1, wherein controlling the exhaust gas flow to the variable-geometry turbocharger includes delaying a maximum restriction of the exhaust gas flow to the variable-geometry turbocharger for the determined time delay.

6. The method of claim 1, wherein determining the time delay for regulation of the exhaust gas flow to the variable-geometry turbocharger is based on a predetermined temperature limit of the exhaust pipe bellows as compared to the exhaust gas temperature at the exhaust pipe bellows.

7. The method of claim 6, wherein the predetermined temperature limit is determined from a look-up table comprising material property data of the exhaust pipe bellows.

8. The method of claim 1, wherein determining the time delay for regulation of the exhaust gas flow to the variable-geometry turbocharger is based on a road load determined during positive torque production of the propulsion system.

9. A method for regulating an exhaust gas flow, comprising:

providing an engine and an exhaust system coupled to the engine, the exhaust system including a variable-geometry turbocharger and exhaust tubing including an exhaust pipe bellows;

providing a controller and at least one sensor in communication with the controller, the at least one sensor configured to measure an engine speed of the engine and output a measured engine speed;

determining, by the controller, whether a first condition is satisfied;

in response to satisfaction of the first condition, determining, by the controller, an exhaust gas temperature at the exhaust pipe bellows and determining, by the controller, a time delay for regulation of the exhaust gas flow to the variable-geometry turbocharger; and controlling, by the controller, the exhaust gas flow to the variable-geometry turbocharger based on the determined time delay.

10. The method of claim 9, wherein the first condition is satisfied when the measured engine speed is above an exhaust engine braking speed.

11. The method of claim 10, wherein determining the time delay for regulation of the exhaust gas flow to the variable-geometry turbocharger is based on the exhaust engine braking speed.

12. The method of claim 10, wherein determining the time delay for regulation of the exhaust gas flow to the variable-geometry turbocharger is based on both the exhaust engine braking speed and a road load determine during positive torque production of the propulsion system.

13. The method of claim 10, wherein the at least one sensor includes a first sensor configured to measure an engine speed of the engine and a second sensor configured to measure an exhaust gas temperature and determining the time delay for regulation of the exhaust gas flow to the engine is based on both a predetermined temperature limit of the exhaust pipe bellows as compared to the exhaust gas temperature and the exhaust engine braking speed.

14. The method of claim 9, wherein controlling the exhaust gas flow to the variable-geometry turbocharger includes delaying a maximum restriction of the exhaust gas flow to the variable-geometry turbocharger for the determined time delay.

15. The method of claim 9, wherein determining the time delay for regulation of the exhaust gas flow to the variable-geometry turbocharger is based on a predetermined temperature limit of the exhaust pipe bellows.

16. The method of claim 15, wherein the predetermined temperature limit is determined from a look-up table comprising material property data of the exhaust pipe bellows.

17. The method of claim 9, wherein determining the time delay for regulation of the exhaust gas flow to the variable-geometry turbocharger is based on a road load determine during positive torque production of the propulsion system.

18. An automotive vehicle system, comprising:

a propulsion system;

an exhaust system coupled to the propulsion system, the exhaust system comprising a variable-geometry turbocharger and exhaust tubing coupled to the variable-geometry turbocharger, the exhaust tubing including an exhaust pipe bellows;

a first sensor configured to measure an engine speed of the vehicle and output first sensor data including a measured engine speed;

a second sensor configured to measure an exhaust gas temperature and output second sensor data including a measured exhaust gas temperature; and at least one controller in communication with the first and second sensors, the at least one controller being configured to receive the first sensor data from the first sensor and the second sensor data from the second sensor and, in response to satisfaction of a first operating condition, determine a time delay for regulation of an exhaust gas flow to the variable-geometry turbocharger and control the exhaust gas flow to the variable-geometry turbocharger based on the determined time delay.

19. The automotive vehicle system of claim 18, wherein the first operating condition is satisfied when the measured engine speed is above an exhaust engine braking speed.

20. The automotive vehicle system of claim 18, wherein the time delay for regulation of exhaust gas flow to the variable-geometry turbocharger is based on one or more of the exhaust engine braking speed and a road load determined during positive torque production of the propulsion system.

* * * * *